Figure 4:
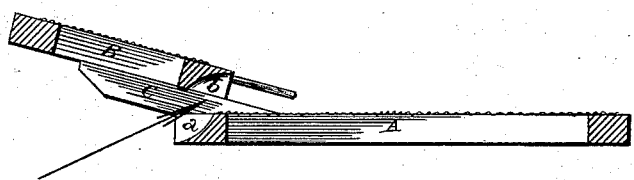

(No Model.) 2 Sheets—Sheet 1.
D. YOUNG.
GRAIN SEPARATOR.
No. 254,858. Patented Mar. 14, 1882.
Fig. 1.
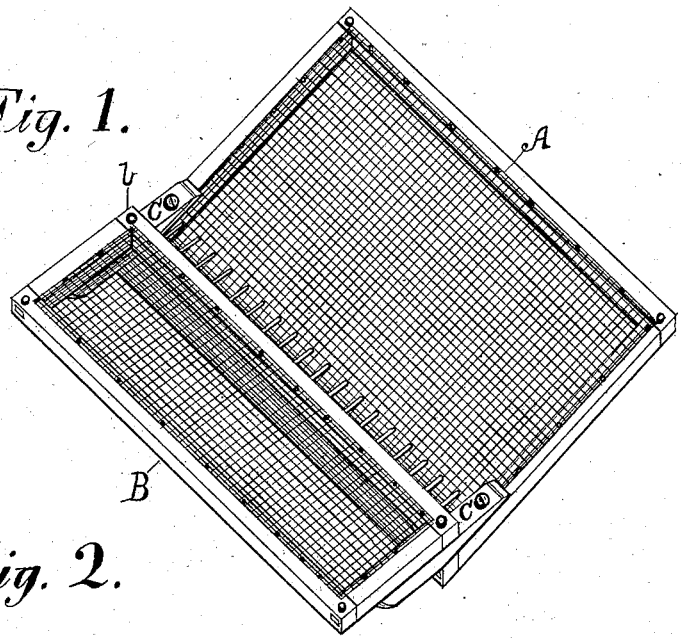
Fig. 2.
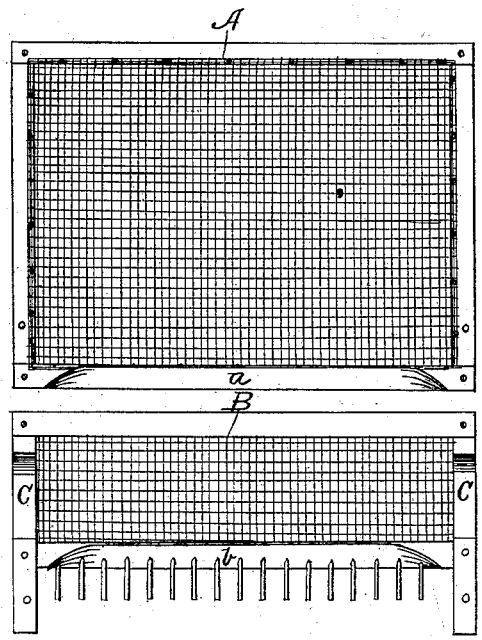
Fig. 3.
Witnesses
Elihu B. Stowe.
Inventor:
David Young.
Per Joshua B. Webster.
Attorney.

(No Model.) 2 Sheets—Sheet 2.

D. YOUNG.
GRAIN SEPARATOR.

No. 254,858. Patented Mar. 14, 1882.

Witnesses:
Wm. W. Mortimer.
W. H. Kern.

Inventor:
David Young
per
J. B. Webster,
Atty.

UNITED STATES PATENT OFFICE.

DAVID YOUNG, OF STOCKTON, CALIFORNIA.

GRAIN-SEPARATOR.

SPECIFICATION forming part of Letters Patent No. 254,858, dated March 14, 1882.

Application filed August 22, 1881. (No model.)

*To all whom it may concern:*

Be it known that I, DAVID YOUNG, a citizen of the United States, residing at Stockton, in the county of San Joaquin and State of California, have invented certain new and useful Improvements in Grain-Separators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain improvements in the cleaning apparatus of that class of agricultural implements known as "grain-separators;" and it consists in simplifying said cleaning apparatus, so that one single sieve is made to take the place of and perform the functions of the ordinary "shoe" furnished with riddles and sieves now in general use in thrashing-machines.

My invention consists in the combination of two sieves of unequal size, which are secured rigidly together by connecting-bars at an angle to each other, the smaller sieve having fingers secured to its inner edge, so as to separate the grain from the straw, and both sieves having their edges cut away, so as to allow the grain to escape between them, as will be more fully described hereinafter.

Referring to the accompanying drawings, Figure 1 is a perspective view of a complete sieve. Fig. 2 is a view of the main section of a sieve. Fig. 3 is a view of the sloping section inverted. Fig. 4 is a vertical section of my invention.

A is the main larger section of my improved sieve, having a beveled-frame front, *a*, the bevel being upon its upper surface. Extension-bars C C are attached by screws or bolts upon the surface of the frame-sides at the front of section A. Upon these extension-bars, slightly sloping toward section A, is bolted a smaller sieve-section, B, having a beveled-frame rear, *b*, the bevel being upon the under surface parallel with the beveled-frame front *a* of main section A, the connection of the two forming a throat or orifice. In the frame rear *b* of section B are inserted fingers or pins of iron, steel, or wood, forming a comb over the orifice. These fingers serve to open up the straw as it passes over them, so that the grain can readily separate from it.

The method of using my improved sieve, so as to supersede and take the place of the clumsy expensive shoes now in use in thrashers, is as follows: I place it in the location in the rear of thrashing-machines usually occupied by the shoe, pivoting it at one end, and oscillating it by power supplied to the other in precisely the same manner as the ordinary thrashing-machine shoe referred to above. The section B occupies a position immediately over the fan of the thrasher, so that the grain, &c., under treatment, falling first thereon from the grain-carrier of the thrasher, is subjected to the blast from the fan, while the oscillating motion carries it down its sloping surface toward the main section A, and while it is passing directly over the fingers of the comb of section B allows it in that position to receive a stronger blast through the orifice or mouth formed by the beveled-frame front *a* and beveled-frame rear *b*, as before described, blowing nearly all the straw and chaff away from the thrasher and permitting only nearly clean grain to pass upon the main section A, where it receives further cleansing by the oscillating motion and by the blast of air from the fan, and drops down into any convenient trough or receptacle.

I have not in the drawings illustrated any part of the operation described above in connection with the thrasher, for the reason that it is of the same character in all thrashing-machines and has been long in use.

Having thus described my invention, what I claim, and desire to secure by Letters Patent, is—

1. The front sieve-section, B, provided with fingers forming a comb upon its rear beveled-frame edge, and connecting-bars C C, combined with the rear sieve-section, A, having a front beveled-frame edge, all constructed substantially as set forth.

2. The combination of two sieves of unequal size, which are secured together at an angle to each other, the smaller one of the two being provided with fingers upon its edge where it overlaps the larger one, and the two sieves having their edges beveled away so as to permit the grain to escape between them, substantially as described.

In testimony whereof I affix my signature in presence of two witnesses.

DAVID YOUNG.

Witnesses:
JOSHUA B. WEBSTER,
ELIHU B. STOWE.